F. B. LEOPOLD.
DEVICE FOR FEEDING GRANULATED OR PULVERIZED MATERIALS.
APPLICATION FILED JULY 19, 1916.
1,324,508.
Patented Dec. 9, 1919.
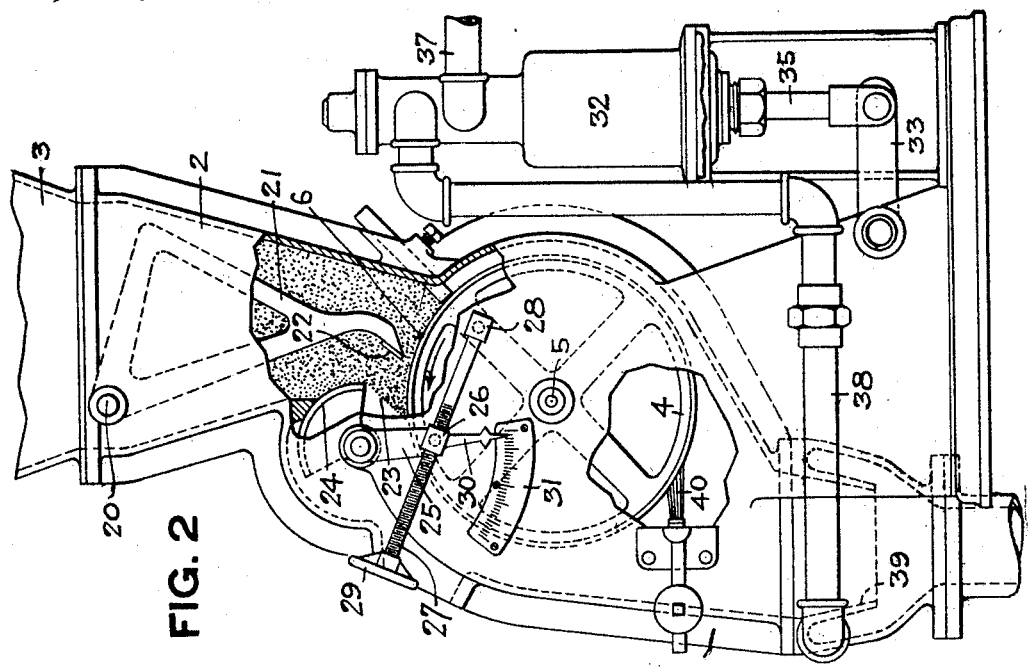
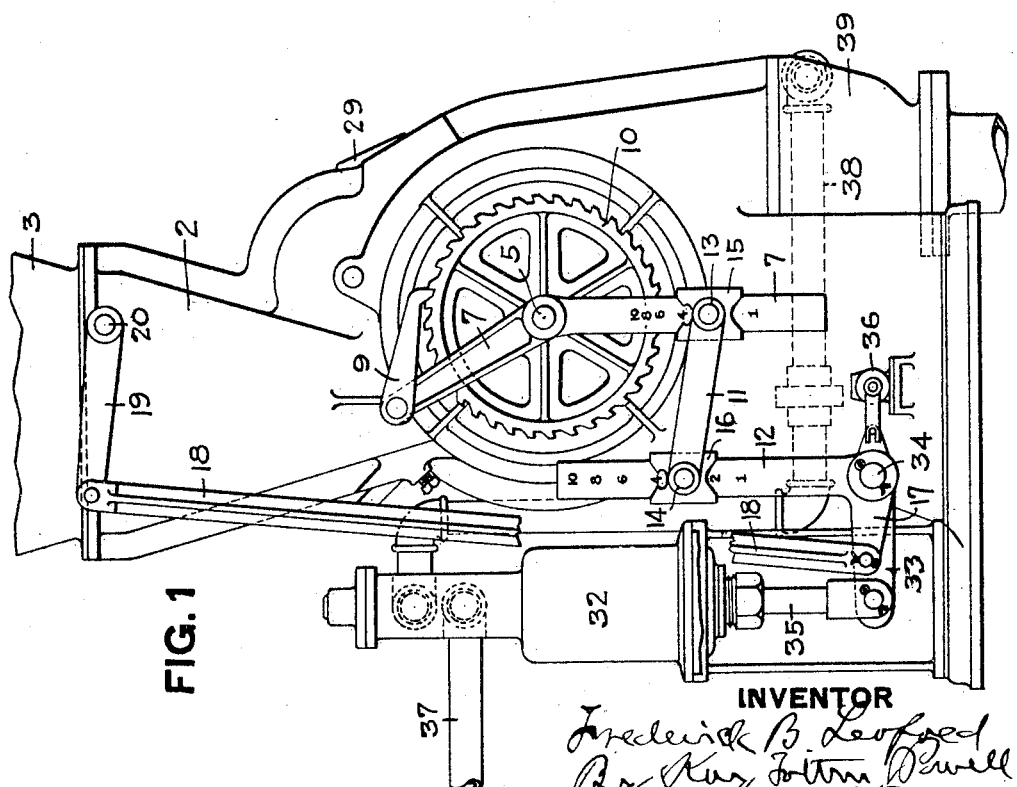
INVENTOR
Frederick B. Leopold

UNITED STATES PATENT OFFICE.

FREDERICK B. LEOPOLD, OF PITTSBURGH, PENNSYLVANIA, ASSIGNOR TO PITTSBURGH FILTER & ENGINEERING COMPANY, OF PITTSBURGH, PENNSYLVANIA, A CORPORATION OF PENNSYLVANIA.

DEVICE FOR FEEDING GRANULATED OR PULVERIZED MATERIALS.

1,324,508. Specification of Letters Patent. Patented Dec. 9, 1919.

Application filed July 19, 1916. Serial No. 110,200.

*To all whom it may concern:*

Be it known that I, FREDERICK B. LEOPOLD, a citizen of the United States, and resident of Pittsburgh, in the county of Allegheny and State of Pennsylvania, have invented a new and useful Improvement in Devices for Feeding Granulated or Pulverized Materials; and I do hereby declare the following to be a full, clear, and exact description thereof.

My invention relates to apparatus for feeding granulated or pulverized materials for use in connection with water or sewerage purification, its object being to provide a device by which the amount of hydrated lime, sulfate of aluminum and sulfate of iron will be fed uniformly and the amount fed accurately regulated and measured.

The invention has for its further object providing means for adjusting the desired amount of material to be fed within a wide range.

To these ends my invention comprises the novel features hereinafter set forth and claimed.

In the accompanying drawing, Figure 1 is a vertical elevation, partly in section, of my improved device; Fig. 2 is an opposite side view.

In the drawings, the numeral 2 designates a suitable funnel, which is placed directly under the hopper 3 to which the pulverized or granulated materials are fed. I have illustrated and described my invention in connection with a device particularly adapted for the feeding of chemicals to water to be used in connection with filter plants.

The wheel 4 is mounted on the shaft 5, said wheel being so located with reference to the funnel or chute 2 that the material delivered to said funnel rests on the top of the flange 6 of said wheel 4. The periphery of the wheel 4 is roughened or knurled so as to give sufficient active friction to move the material. The discharge end of the chute or funnel 2 is so arranged with reference to the wheel 4 that when the wheel is not in rotation the material will rest upon the wheel, for the most part, back of the center line of the wheel, as clearly indicated in Fig. 2. An intermittent drive in the form of apparatus illustrated is imparted to the wheel 4, and to accomplish this a lever 7 is mounted on the shaft 5, the upper arm of said lever having the pawl 9, which engages the ratchet wheel 10 connected to the wheel 4. I do not however limit my invention to an intermittent drive. The lower end of the arm 7 is connected by the link 11 to the lever 12. The fulcrum points 13 and 14 of the levers 7 and 12 are adjustable, the slides 15 and 16 being slidable on the arms 7 and 12 to change the location of the said fulcrum points. The arm 17 of the lever 12 is connected to the rod 18, the upper end of said rod being connected by the link 19 to the rock-shaft 20. This rock-shaft 20 carries the agitator 21, which, in the form illustrated, consists of a triangular shaped frame corresponding generally to the shape of the funnel, and extending down therein. The lower end of said agitator has the shovel or pusher 22, which moves back and forth as the agitator is oscillated and moves the material toward the discharge opening 23 formed in the front wall of the chute between the periphery of the wheel 4 and the lower end of the shutter 24, illustrated in the form of a segment. The size of this opening 23 is controlled by the position of the shutter 24, said shutter being connected to the arm 25. This arm 25 has the nut 26 through which the threaded bar 27 passes, the inner end of said bar being swiveled in the swivel-block 28. The outer end of the threaded bar 27 is provided with the operating wheel 29. The lower end of the arm 25 has the pointer 30 moving over the graduated scale 31 by which the opening of the orifice 23 may be registered in degrees.

The device is operated by a suitable water-motor 32, preferably what is known as a variable-speed, duplex water-motor. The arm 33 is connected up to the jack-shaft 34 on which the lever 12 is mounted. The arm 33 is connected up with the piston 35 of the motor.

The combined stroke and water consumption counter 36 is connected up with the lever 12 whereby the amount of water consumed in cubic feet will be registered. If the motor is designed to discharge 1/10 of a cubic foot at each stroke, the figures on the stroke counter will also indicate the water consumed in cubic feet.

The pressure supply is admitted to the water motor by the pipe 37, and the water discharged by it is indicated by the numeral 38. This water discharge pipe leads to the point where the chemical is discharged by the wheel and supplies the pulverized material with liquid to liquefy or wash away the chemicals fed by the wheel. The water admitted by pipe 37 may be a controlled proportionate flow from a supply main of a filler-plant to a settling tank, whereby the amount of pulverized material may be accurately proportioned to the flow of water to said settling tank. Each stroke of the motor discharges a definite quantity of water to be returned with a proportionate amount of chemical to the settling tank to secure accurate chemical treatment of the water and proper coagulation.

When the device is in operation, the pulverized material will, where no motion is imparted to the wheel, slope due to its natural angle of repose through the orifice 23 resting on the flange 6 of the wheel 4. When motion is imparted to the wheel 4 in the direction of the arrow, a motion will be imparted to the shovel or pusher 22 in the same direction as indicated by the arrow, the apparatus being timed to operate in this way so that the material will be influenced by the agitator in the same manner during each stroke and, consequently, uniformity of feed can be relied on. By adjusting the fulcrum boxes 15 and 16, different speeds will be given to the carrying wheel 4 and this in turn will produce a change in the amount of material fed per stroke. The amount of material to be fed per stroke may also be changed by changing the size of the opening 23, which is accomplished by turning the hand-wheel 29 and moving the shutter 24.

The material carried along by the wheel 4 is dumped into the funnel 39 and is met there by the water discharged from the motor through the pipe 38, and the chemical is in this way liquefied and carried on to the point of use.

My improved apparatus will feed correctly any free-flowing material, but sluggish materials need assistance, and by the use of an agitator the kind of materials that can be successfully used in this machine can be largely increased.

A wire brush 40 may be employed to bear against the periphery of the wheel 4 in order to remove any material adhering to the wheel from whence this material will be delivered to the hopper 39.

By my invention, I provide a device of this character in which the feed of the material is uniform which insures great accuracy in the feed of chemicals where the device is used in connection with a filter plant, and this is due to the fact that the pusher 22 moves at the same time as the wheel moves, and at the same time there is a wide range of feed due to the adjustability of the fulcrums 15 and 16 by which different speed will be given to the carrying-wheel, and this will, in turn, produce a change in the amount of material fed per stroke.

What I claim is:

1. In a device for feeding granulated or pulverized material, the combination of a chute, and a rotary wheel located below the discharge end of said chute having a knurled periphery.

2. In a device for feeding granulated or pulverized material, the combination of a chute, a rotary wheel at the discharge end of said chute having a knurled surface, and means for intermittently rotating said wheel.

3. In a device for feeding granulated or pulverized material, the combination of a chute, a rotary wheel located at the discharge end of said chute and slightly forward of same whereby the material will be supported at rest on said wheel when not rotating, and said chute having an opening in its front wall beyond which the material extends when resting on said wheel.

4. In a device for feeding granulated or pulverized material, the combination of a chute, a rotary wheel located at the discharge end of said chute and slightly forward of same whereby the material will be supported at rest on said wheel when not rotating, said chute having an opening in its front wall beyond which the material extends when resting on said wheel, and means for varying the size of said opening of said chute.

5. In a device for feeding granulated or pulverized material, the combination of a chute, a rotary wheel located at the discharge end of said chute and slightly forward of same whereby the material will be supported at rest on said wheel when not rotating, said chute having an opening in its front wall beyond which the material extends when resting on said wheel, and an adjustable shutter controlling said opening of said chute.

6. In a device for feeding granulated or pulverized material, the combination of a chute, a rotary wheel located at the discharge end of said chute and slightly forward of same whereby the material will be supported at rest on said wheel when not rotating, said chute having an opening in its front wall beyond which the material extends when resting on said wheel, a movable segmental shutter adapted to control the size of said opening of said chute, an arm connected to said shutter, and means for moving said arm.

7. In a device for feeding granulated or pulverized material, the combination of a chute, a rotary wheel located at the discharge end of said chute and slightly forward of same whereby the material will be supported at rest on said wheel when not rotating, said chute having an opening in its front wall beyond which the material extends when resting on said wheel, a movable segmental shutter to control the size of said opening of said chute, an arm connected to said shutter, a nut on said arm, and a threaded bar engaging said nut.

8. In a device for feeding granulated or pulverized materials, the combination of a rotary wheel, means for delivering material to the periphery of said wheel, a pusher, and means for advancing said pusher as said wheel is rotated and in the same direction as the movement of said wheel.

9. In a device for feeding granulated or pulverized material, the combination of a rotary wheel, means for feeding material to the periphery of said wheel, an oscillating pusher, and means for moving said pusher in the direction of the rotation of said wheel when said wheel is rotated.

10. In a device for feeding granulated or pulverized material, the combination of a rotary wheel, means for varying the speed of rotation of said wheel, a pusher, means for advancing said pusher in the same direction and at the same time said wheel moves, and means for varying the movement of said pusher to correspond to the speed of said wheel.

11. In a device for feeding granulated or pulverized material, the combination of a shaft, a wheel on said shaft, a ratchet wheel on said shaft, a lever on said shaft, a pawl carried by said lever engaging said ratchet wheel, a second lever, connections between said first-named lever and said second lever, a suitable motor, connections between said second-named lever and said motor, a pusher, connections between said second-named lever and said pusher, whereby as said first-named lever is operated to rotate said wheel said pusher is moved in the same direction as the rotation of said wheel.

12. In a device for feeding granulated or pulverized material, the combination of a shaft, a ratchet wheel on said shaft, a lever on said shaft, a pawl carried by said lever engaging said ratchet wheel, a second lever, a link connecting said levers and adjustable thereon, a suitable motor, connections between said second-named lever and said motor, a pusher, connections between said second-named lever, and said pusher whereby as said first-named lever is operated to rotate said wheel, said pusher is moved in the same direction as the rotation of said wheel.

13. In a device for feeding granulated or pulverized material, the combination of a shaft, a wheel on said shaft, a ratchet wheel on said shaft, a lever on said shaft, a pawl carried by said lever engaging said ratchet wheel, a second lever, slides on said levers, a link connecting said slides, suitable motor connections between said second-named lever and said motor, a pusher, connections between said second-named lever and said pusher whereby, as said first-named lever is operated to rotate said wheel, said pusher is moved in the same direction as the rotation of said wheel.

14. In a device for feeding granulated or pulverized materials, the combination of mechanism for delivering the material in measured quantities, a liquid operated motor for operating said mechanism, and means for delivering the liquid from said motor to the point of discharge of said material whereby said material is liquefied.

In testimony whereof, I the said FREDERICK B. LEOPOLD, have hereunto set my hand.

FREDERICK B. LEOPOLD.

Witnesses:
ROBT. D. TOTTEN,
JOHN F. WILL.